June 2, 1925.
J. E. ALLEN
ANIMAL TRAP
Filed Jan. 3, 1923
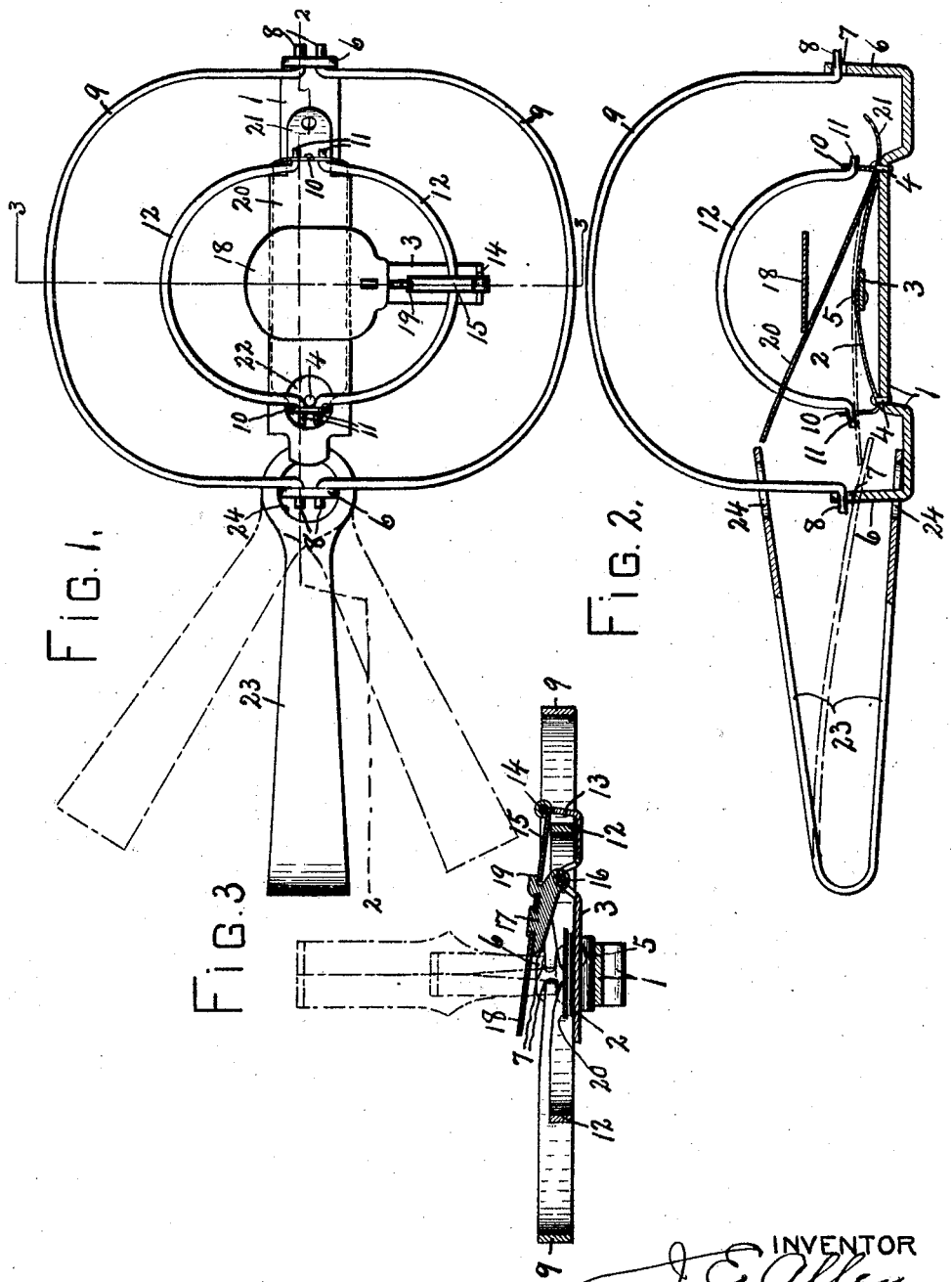
INVENTOR
J. E. Allen
BY
Howard V. Denison
ATTORNEY Patented June 2, 1925.

1,540,590

UNITED STATES PATENT OFFICE.

JARED E. ALLEN, OF ONEIDA, NEW YORK, ASSIGNOR TO ONEIDA COMMUNITY, LTD., OF ONEIDA, NEW YORK, A CORPORATION OF NEW YORK.

ANIMAL TRAP.

Application filed January 3, 1923. Serial No. 610,465.

*To all whom it may concern:*

Be it known that I, JARED E. ALLEN, a citizen of the United States of America, of Oneida, in the county of Madison, in the State of New York, have invented new and useful Improvements in Animal Traps, of which the following, taken in connection with the accompanying drawings, is a full, clear, and exact description.

This invention relates to animal traps of the primary and secondary type, both mounted one within the other upon the same supporting frame so that their jaws may swing about parallel axes with the bait pan centrally within the primary or innermost trap.

Double traps of this character are designed to be more humanitarian than single traps in that they are quicker in execution of the animal caught by reason of their ability to close upon the body as well as upon the legs of the animal and at the same time reducing the liability of escape of the animal from the trap.

Furthermore, it is desirable to provide an operating spring for each set of jaws and to control the closing of both sets through the medium of a single detent cooperating with the bait pan and one of the main objects of the invention is to utilize a portion of the primary spring as a detent for holding the secondary spring under tension when both traps are set, and in such manner that the secondary spring will add its power to that of the primary spring in closing the primary trap with greater force in addition to which function of closing the secondary trap when the primary trap is released by the tripping of its detent.

Another object is to enable the primary spring to hold the secondary spring under tension in all positions of angular adjustment of the secondary spring when the trap is set.

A further object is to simplify the construction of traps of this character and thereby to enable it to be set and operated with greater ease, and efficiency.

A still further object is to enable the secondary jaws as well as one of the primary jaws to be adjusted angularly to different positions as may be required in placing the trap in more or less cramped places.

Other objects and uses relating to specific parts of the device will be brought out in the following description:

In the drawings:

Figure 1 is a top plan of a trap embodying the various features of my invention with the jaws set in their open positions ready for use.

Figure 2 is a longitudinal sectional view on line 2—2, Figure 1 except that the jaws are closed.

Figure 3 is a transverse sectional view taken on line 3—3, Figure 1.

As illustrated, the main supporting frame comprises a relatively rigid lengthwise bar —1— and a supplemental resilient plate —2— being secured near its ends to the underlying bar —1— by means of rivets —4— while the cross bar —3— is secured to the under side of the central portion of the plate —2— by means of rivets —5— thus producing a unitary frame structure.

The ends of the frame bar —1— are bent upwardly to form similar lugs or ears 6 which preferably extend above the horizontal plane of the plate —2— and are provided with longitudinally registering apertures —7— for receiving pintles —8— on the adjacent ends of a pair of supplemental or secondary jaws —9—, each lug or ear —6— being provided with a pair of apertures —7— preferably in transversely spaced relation to afford independent bearings for the pintles of each of the jaws —9—.

The frame bar —2— is relatively shorter than the bar —1— and is secured thereto lengthwise thereof, substantially midway between the lugs —6—, the ends of the bar —2— being provided with upturned apertured lugs —10— for receiving the pintles as —11— of a pair of primary jaws —12— which are also of considerably less length and height than the jaws —9— to permit the free operation of both sets of jaws without interference one with the other.

The cross bar —3— extends laterally to one side of the plate —2— and bar —1— at right angles thereto, a distance somewhat greater than the longer radius of either of the primary jaws —12— so as to underlie one of said jaws when the latter is opened or set and terminates in an upturned extension —13— having a pintle —14— to which is hinged one end of a detent —15—.

The intermediate portion of the cross bar is pressed upwardly and slotted to form a pintle —16— to which is pivoted a lever —17— carrying a bait pan or platform —18— directly over the central portions of the bar —1— and plate —2—, said lever —17— being provided with a shoulder —19— adapted to be engaged by the detent —15— to hold the bait pan in its set position.

The detent —15— extends over the upper edge of the adjacent jaw —12— when opened for holding said jaw in its open position against the action of its retracting spring presently described.

A leaf spring —20— has one end —21— reduced in width and inserted through a slot in one of the lugs —10— near its junction with the main body of the plate —2—, the other end of the spring being extended beyond the opposite lug and provided with an opening —22— for receiving the adjacent ends of the jaws —12— and forming opposed shoulders which engage the outer edges of said jaws to close the same when the detent —15— is released by the depression of the bait pan —18— as for example, by the animal for which the trap is set.

A V-shaped leaf spring —23— is operably connected to the end of the trap adjacent the free end of the spring —20— to extend outwardly therefrom and has its free ends provided with openings —24— for receiving the adjacent lug —6— and corresponding ends of the jaws —9—, one end of the spring resting upon the adjacent portion of the bar —1— while the other end is spring tensioned to slide along the outer edges of the adjacent ends of the jaws —9— for closing the same when the detent —15— is released.

These openings —24— and adjacent ends of the spring —23— are substantially circular to permit the spring to be turned laterally or angularly to different positions relatively to the longitudinal center of the bar —1— and jaws —9— and —12— and for the addiitonal purpose of maintaining overlapping relation between adjacent ends of the springs —20— and —24— when the primary and secondary jaws are set as will be presently described.

That is, the free ends of the leaf spring —20— and upper leaf of the spring —23— lie in close proximity to each other when both springs are retracted and the jaws closed as shown in Figure 2 leaving just sufficient clearance to permit the upper leaf of the spring —23— to be depressed for setting the jaws —9— without interference with the adjacent end of the spring —20— which latter may then be depressed to set the jaws —12— and to cause its free end to overlap upon the adjacent end of the upper leaf of the spring —23— to hold the latter in its set position against its own tension when the spring —20— is depressed and held under tension by the locking of one of the jaws —12— through the medium of the detent —15— as shown in Figure 3 and by dotted lines in Figure 2.

In other words, the free ends of the leaf spring —20— and upper leaf of the spring —23— move vertically through intersecting arcs above and below the intersection of said arcs so that when opened they will be slightly separated, but when closed, the free end of the spring —23— to hold the latter against its own tension and permit the spring —23— to swing laterally to different angles without disengaging the adjacent end of the spring —20—, said angular adjustment of the spring —23— being frequently necessary in properly setting the trap in the most advantageous position.

When the primary and secondary jaws are set in the manner described, the jaws —9— may be adjusted angularly about their respective axes as may be necessary to place the trap in a more or less retracted or cramped place, it being understood that the jaw at —12— of the primary trap opposite the one engaged by the detent —15— is also capable of angular adjustment when the trap is set.

The central portion of the plate —2— is arched upwardly to afford a certain amount of resiliency while the leaf spring —20— bears upon the upper face of the arched portion so that when depressed it is placed under tension and also tends to spring the plate —2— downwardly under tension, the effect of which is that additional closing power is imparted to the jaws —12— when the detent —15— is released.

It will be also observed that by utilizing the free end of the spring —20— as a detent for holding the free end of the upper leaf of the spring —23— under compression, the release of the detent —15— will cause the spring —23— to exert its lifting force upon the overlapping end of the spring —20— thereby effecting the closing of the jaws —12— with the increased power of the spring —23— added to that of the spring —20— while the spring —23— will also effect a simultaneous closing of the supplemental jaws —9— all of which greatly increases the efficiency of the trap as a whole and assures a double grip upon the animal by both sets of jaws, the inner set —12— being adapted to engage the leg or legs of the animal with the initial force of both the springs while the larger jaws —9— are adapted to engage the body of the animal thereby producing a more instaneous execution and assuring a firmer grip upon the animal to prevent escape.

Operation.

The operation briefly described is as follows:

In setting the trap, the spring —23— is first compressed to allow the jaws —9— to be opened after which the spring —20— is depressed to allow the opening of the jaws —12— in which position they are locked by the engagement of the detent —15— with one of said jaws and with the shoulder —19— of the bait pan, whereupon the free end of the spring —20— will be brought into overlapping engagement with the free end of the upper leaf of the spring —23— to hold the latter under compression, all the jaws being then opened.

When the bait pan —18— is depressed as for example, by the foot of the animal, it will instantly release the detent —15— from engagement therewith and allow both sets of jaws to be closed by their respective springs —20— and —23— during which the spring —23— adds its force or power to that of the spring —20— in gripping the animal between the jaws, the spring plate —2— also adding its power to the initial movement of the spring —20—.

I claim:

1. In an animal trap, two sets of jaws and separate operating springs therefor, means for holding one set of jaws against the action of its spring, one of said springs engaging and holding the other spring against closing its jaws while the first named means is in its holding position said springs being extended in opposite directions from their points of engagement.

2. In an animal trap, two sets of jaws pivotally supported, one between the ends of the other, to swing about parallel axes, a leaf spring for closing the outer set of jaws, an additional leaf spring for closing the inner set of jaws, and having a portion thereof engaging the upper face of the first named spring when the jaws are opened to hold said first named spring under tension, said springs being extended in opposite directions from their points of engagement, and means releasable by an animal for holding the inner jaws open against the action of the second named spring.

3. In an animal trap, two sets of jaws and a supporting frame therefor, a spring for closing one set of jaws, an additional spring for closing the other set of jaws and engaging the first named spring when the jaws are open to add its power thereto in closing both sets, said springs being extended in opposite directions from their points of engagement and means adapted to be released by the animal for holding one set of jaws against the action of its spring.

4. In an animal trap, a supporting frame, inner and outer sets of jaws mounted on the frame, a bow spring bearing on the frame within the inner jaws, a leaf spring bearing on the bow spring and engaging the inner set of jaws to close the same, means adapted to be released by an animal for holding the inner jaws in open position, a separate spring hinged to the frame to swing laterally and engaging the outer jaws for closing the same, the second named spring engaging and holding the third named spring in its tensioned position.

In witness whereof I have hereunto set my hand this 23rd day of December, 1922.

JARED E. ALLEN.

Witnesses:
E. M. SANTRY,
E. B. BEDFORD.